United States Patent
Singh et al.

(10) Patent No.: US 11,831,538 B2
(45) Date of Patent: Nov. 28, 2023

(54) TRAFFIC ENGINEERING FOR IMPROVED BANDWIDTH ALLOCATIONS

(71) Applicant: Microsoft Technology Licensing, LLC, Redmond, WA (US)

(72) Inventors: Rachee Singh, Redmond, WA (US); Sharad Agarwal, Seattle, WA (US); Matt Calder, Seattle, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/320,377

(22) Filed: May 14, 2021

(65) Prior Publication Data

US 2022/0278921 A1  Sep. 1, 2022

Related U.S. Application Data

(60) Provisional application No. 63/154,781, filed on Feb. 28, 2021.

(51) Int. Cl.
*H04L 45/00* (2022.01)
*H04L 45/12* (2022.01)
*H04L 47/122* (2022.01)

(52) U.S. Cl.
CPC ............ *H04L 45/123* (2013.01); *H04L 45/22* (2013.01); *H04L 45/566* (2013.01); *H04L 47/122* (2013.01)

(58) Field of Classification Search
CPC ..... H04L 45/123; H04L 45/22; H04L 45/566; H04L 47/122
See application file for complete search history.

(56) References Cited

U.S. PATENT DOCUMENTS

| 7,376,086 B1 * | 5/2008 | Paraschiv | H04L 45/04 370/231 |
| 8,798,088 B1 * | 8/2014 | Shetty | H04W 28/18 370/437 |

(Continued)

FOREIGN PATENT DOCUMENTS

| WO | 2014044821 A1 | 3/2014 |
| WO | 2016155974 A1 | 10/2016 |

OTHER PUBLICATIONS

"Caida AS Classification", Retrieved From: https://www.caida.org/data/as-classification/#:~:text=Dataset%20temporarily%20unavailable%20%7C-,Method,according%20to%20their%20business%20type.&text=We%20then%20train%20a%20machine,%2Dtree%20machine%2Dlearning%20classifier, Jan. 2021, 2 Pages.

(Continued)

*Primary Examiner* — Boris D Grijalva Lobos
*Assistant Examiner* — Kidest Mendaye

(57) ABSTRACT

Systems and methods for routing packet data for transmission via a plurality of communication links are described. A method may include dividing a usage cycle for the plurality of communication links into a plurality of timeslots. Packet data traffic demands for the packet data for transmission via the plurality of communication links may be received. Based on a mixed integer linear programming model, an allocation of the packet data traffic demands to the plurality of communication links during the usage cycle may be determined using binary constraints of the mixed integer linear programming model. The binary constraints may prioritize respective subsets of the plurality of timeslots for at least some of the plurality of communication links. For each of the plurality of timeslots, an allocation of the packet data traffic demands to each of the plurality of communication (Continued)

links may be determined using the mixed integer linear programming model.

11 Claims, 9 Drawing Sheets

(56) References Cited

U.S. PATENT DOCUMENTS

| | | | | |
|---|---|---|---|---|
| 2008/0219269 | A1* | 9/2008 | Minkenberg | H04L 12/66 370/395.4 |
| 2012/0303788 | A1* | 11/2012 | Heinrich | H04W 72/1257 709/223 |
| 2017/0161609 | A1* | 6/2017 | Wood | H04L 45/121 |
| 2017/0181146 | A1* | 6/2017 | Franceschini | H04B 7/26 |
| 2018/0227043 | A1* | 8/2018 | Dankberg | H04B 7/18515 |
| 2019/0007308 | A1* | 1/2019 | Mandal | H04L 45/04 |
| 2020/0007236 | A1* | 1/2020 | Choudhury | H04L 41/0823 |
| 2021/0114616 | A1* | 4/2021 | Altman | H04W 36/00837 |

OTHER PUBLICATIONS

"CPLEX Optimizer", Retrieved From: https://web.archive.org/web/20180717205949/https://www.ibm.com/analytics/cplex-optimizer, Retrieved Date: Jul. 17, 2018, 6 Pages.
"Net Neutrality", Retrieved From: https://web.archive.org/web/20180402075009/https://www.freepress.net/issues/free-open-internet/net-neutrality, Retrieved Date: Apr. 2, 2018, 4 Pages.
"The State of the Network", In Publication of TeleGeography, 2019, 25 Pages.
Achterberg, Tobias, "Gurobi Optimization", Retrieved From: https://web.archive.org/web/20210327053300/ https://www.gurobi.com/, Retrieved Date: Mar. 27, 2021, 19 Pages.
Arnold, et al., "Beating Bgp Is Harder Than We Thought", In Proceedings of the 18th ACM Workshop on Hot Topics in Networks, Nov. 13, 2019, 8 Pages.
Bertsekas, et al., "Data Networks", In Publication of Prentice Hall, Jan. 5, 1992, 70 Pages.
Calder, et al., "Odin: Microsoft's Scalable Fault-Tolerant CDN Measurement System", In proceedings of the 15th USENIX Symposium on Networked Systems Design and Implementation, Apr. 9, 2018, 18 Pages.
Chiu, et al., "Are We One Hop Away from a Better Internet?", In Proceedings of the Internet Measurement Conference, Oct. 28, 2015, pp. 523-529.
Chou, et al., "Taiji: Managing Global User Traffic For Large-Scale Internet", In Proceedings of the 27th ACM Symposium on Operating Systems Principles, Oct. 27, 2019, pp. 430-446.
Goldernberg, et al., "Optimizing Cost And Performance For Multihoming", In Journal of ACM SIGCOMM Computer Communication Review, vol. 34, Issue 4, Aug. 30, 2004, pp. 79-92.
Golubchik, et al., "To Send Or Not To Send: Reducing The Cost Of Data Transmission", In Proceedings of IEEE Infocom, Apr. 14, 2013, pp. 1-9.
Grant, et al., "Software for Disciplined Convex Programming", Retrieved Form : http://cvxr.com/, Retrieved Date: Dec. 5, 2008, 2 Pages.
Griva, et al., "Linear and Nonlinear Optimization", In Publication of SIAM, Jan. 1, 2009 9 Pages.
Harchol, et al., "A Public Option For The Core", In Proceedings Of The Annual Conference Of The Acm Special Interest Group On Data Communication On The Applications, Technologies, Architectures, And Proto-cols For Computer Communication, Jul. 2020, pp. 377-389.
Hong, et al., "Achieving High Utilization With Software-Driven WAN", In Proceedings of the ACM SIGCOMM Conference on SIGCOMM, Aug. 12, 2013, pp. 15-26.

Jain, et al., "B4: Experience with a Globally-deployed Software Defined Wan", In Proceedings of the Conference ACM SIGCOMM, Aug. 12, 2013, pp. 3-14.
Jalaparti, et al., "Dynamic Pricing and Traffic Engineering for Timely Inter-Datacenter Transfers", In Proceedings of The ACM SIGCOMM Conference, Aug. 22, 2016, pp. 73-86.
Laoutaris, et al., "Delay tolerant bulk data transfers on the internet.", In Proceedings Of The Eleventh International Joint Conference On Measurement And Modeling Of Computer Systems, Jun. 15, 2009, pp. 229-238.
Levy, Steven, "In The Plex: How Google Thinks, Works, And Shapes Our Lives", In The Books of In The Plex, Apr. 12, 2011, 5 Pages.
Li, et al., "Trafficshaper: shaping inter-datacenter traffic to reduce the transmission cost", In Journal of IEEE/ACM Transactions on Networking, vol. 26, Issue 3, Jun. 2018, pp. 1193-1206.
Luckerson, Victor, "Netflix's Disputes With Verizon, Comcast Under Investigation", Retrieved From: https://time.com/2871498/fcc-investigates-netflix-verizon-comcast/, Jun. 13, 2014, 3 Pages.
Makhorin, Andrew, "GLPK (GNU Linear Programming Kit)", Retrieved From: https://www.gnu.org/software/glpk/, Jun. 23, 2012, 3 Pages.
Mason, et al., "Pricing Congestible Network Resources", In Proceedings of the IEEE Journal On Selected Areas In Communications, vol. 13, Issue 7, Sep. 7, 1995, pp. 1141-1149.
Matthew, Prince, "Cloudflare During the Coronavirus Emergency", Retrieved From: https://blog.cloudflare.com/cloudflare-during-the-coronavirus-emergency/, Mar. 12, 2020, 5 Pages.
Norton, WilliamB, "The Art of Peering: The Peering Playbook", In Internet Peering white Papers, Aug. 2010, 16 Pages.
Quoitin, et al., "Interdomain Traffic Engineering With BGP", In Journal of IEEE Communications Magazine, vol. 41, Issue 5, May 21, 2003, pp. 122-128.
Schlinker, et al., "Engineering Egress with Edge Fabric", In Proceedings of the Conference of the ACM Special Interest Group on Data Communication, Aug. 21, 2017, 14 Pages.
Schlinker, et al., "Internet Performance From Facebook's Edge.", In Proceedings of the Internet Measurement Conference, Oct. 21, 2019, pp. 179-194.
Singh, et al., "Cost-Effective Cloud Edge Traffic Engineering with CASCARA", Retrieved From: https://www.microsoft.com/en-us/research/publication/cost-effective-cloud-edge-traffic-engineering-with-cascara/, Apr. 2021, pp. 1-16.
Stanojevic, et al., "On Economic Heavy Hitters: Shapley Value Analysis Of 95th-Percentile Pricing", In Proceedings Of The 10th ACM Sigcomm Conference On Internet Measurement, Nov. 1, 2010, pp. 75-80.
Wohlfart, et al., "Leveraging Interconnections For Performance: The Serving Infra-structure Of A Large CDN", In Proceedings of the Conference of the ACM Special Interest Group on Data Communication, Aug. 20, 2018, pp. 206-220.
Yap, et al., "Taking The Edge Off With Espresso: Scale, Reliability And Pro-grammability For Global Internet Peering", In Proceedings of the Conference of the ACM Special Interest Group on Data Communication, Aug. 21, 2017, pp. 432-445.
Zarchy, et al., "Nash-Peering: A New Technoeconomic Framework For Internet Interconnections", In Repository of arXiv:1610.01314, Oct. 5, 2016, pp. 1-7.
Zhang, et al., "Optimizing Cost And Performance In Online Service Provider Networks", In Proceedings Of The 7th USENIX Conference On Networked Systems Design And Implementation, Apr. 2010, pp. 1-15.
"International Search Report & Written Opinion issued in PCT Application No. PCT/US22/017118", dated Jun. 30, 2022, 12 Pages.

* cited by examiner

600

TRAFFIC ENGINEERING FOR IMPROVED BANDWIDTH ALLOCATIONS

CROSS-REFERENCE TO RELATED APPLICATIONS

This application claims priority to and the benefit of U.S. Provisional Patent Application No. 63/154,781, filed on Feb. 28, 2021, the disclosure of which is hereby incorporated herein by reference in its entirety.

BACKGROUND

Managing the flow of data traffic between domains frequently balances tradeoffs between providing a desired level of bandwidth or latency (e.g., a maximum latency) over a communication link and avoiding forced bandwidth reductions over that communication link due to overuse. For example, in some scenarios, an internet service provider ("ISPs") that provides long-haul connections from a peer network to geographically distant network nodes may initially provide a high level of bandwidth to the peer network, but then provide a reduced level of bandwidth when a data limit ("data cap" or other suitable threshold) has been reached, or is likely to be reached, within a predetermined period of time. As an example, an ISP may provide an inbound bandwidth of up to 4 gigabits per second at a point of presence ("POP") of the ISP until a data cap of 100 terabits within a monthly billing cycle has been reached (or will likely be reached within the billing cycle), at which point the POP may throttle the provided bandwidth down to 1 gigabit per second until the end of the billing cycle. In some scenarios, the ISP applies other negative feedback to overuse of the communication link, for example, reducing a quality of service level or increasing a per gigabit peering rate for data transferred over the communication link. In this way, the ISP may reduce the likelihood of a peer network overburdening the communication link by using very high bandwidth to the exclusion of other customers, and/or obtain a higher monthly fee for the peer network's use of the communication link.

When negative feedback is utilized in response to overuse, a peer network may attempt to spread outbound traffic out over several communication links or even several ISPs by using traffic engineering techniques in order to avoid reaching thresholds that trigger negative feedback. However, traffic engineering by a peer network becomes more challenging when the ISPs use several tiered thresholds with increasingly negative feedback in a non-linear manner.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to routing packet data for transmission via a plurality of communication links. More specifically, packet data may be routed from, or through, a cloud network to a client device. High bandwidth and low latency connections to clients are desirable, but may be costly to implement either in hardware costs (i.e., routers, switches, and servers) or peering rates when a client's packet data must be transmitted through an intermediate network or domain, such as an Internet Service Provider (ISP). When packet data is routed via a communication link to an ISP in order to reach a client, overuse of that communication link may cause the ISP to impose negative feedback on packet flows through the communication link. Examples of negative feedback include reduced capacity or bandwidth, increased latency, or increased peering rates. Inter-domain bandwidth costs comprise a significant amount of the operating expenditure of cloud providers. Traffic engineering systems at the cloud edge must strike a fine balance between minimizing peering rates and maintaining the latency expected by clients. The nature of this tradeoff may be complex due to non-linear peering rates that are prevalent in the market for providing inter-domain bandwidth.

In one aspect, a computer-implemented method of routing packet data for transmission via a plurality of communication links is provided. The method includes dividing a usage cycle for the plurality of communication links into a plurality of timeslots. Packet data traffic demands for the packet data for transmission via the plurality of communication links are received. Based on a mixed integer linear programming model, an allocation of the packet data traffic demands to the plurality of communication links during the usage cycle is determined using binary constraints of the mixed integer linear programming model. The binary constraints prioritize respective subsets of the plurality of timeslots for at least some of the plurality of communication links. For each of the plurality of timeslots, one or more gateways that correspond to the plurality of communication links are reconfigured to route the packet data using the determined allocation of the packet data traffic demands.

In another aspect, a computer-implemented method of routing packet data for transmission via a plurality of communication links is provided. The method includes dividing a usage cycle for the plurality of communication links into a plurality of timeslots. Allocations of respective base bandwidths are determined for each communication link of the plurality of communication links. The respective base bandwidths are selected as a fraction of an estimated total bandwidth for the usage cycle over the plurality of communication links. For each timeslot, when a traffic demand of the timeslot includes excess demand that exceeds the fraction of the estimated total bandwidth, an allocation of the excess demand to an augmented communication link of the plurality of communication links is determined until the augmented communication link has reached full capacity. One or more gateways that correspond to the plurality of communication links are reconfigured to route the packet data using the determined allocations.

In yet another aspect, a system is provided. The system includes at least one processor and at least one memory storing computer-executable instructions that when executed by the at least one processor cause the system to: divide a usage cycle for the plurality of communication links into a plurality of timeslots; receive packet data traffic demands for the packet data for transmission via the plurality of communication links; based on a mixed integer linear programming model, determine an allocation of the packet data traffic demands to the plurality of communication links during the usage cycle using binary constraints of the mixed integer linear programming model, wherein the binary constraints prioritize respective subsets of the plurality of timeslots for at least some of the plurality of communication links; and reconfigure, for each of the plurality of timeslots, one or more gateways that correspond to the plurality of communication links to route the packet data using the determined allocation of the packet data traffic demands.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
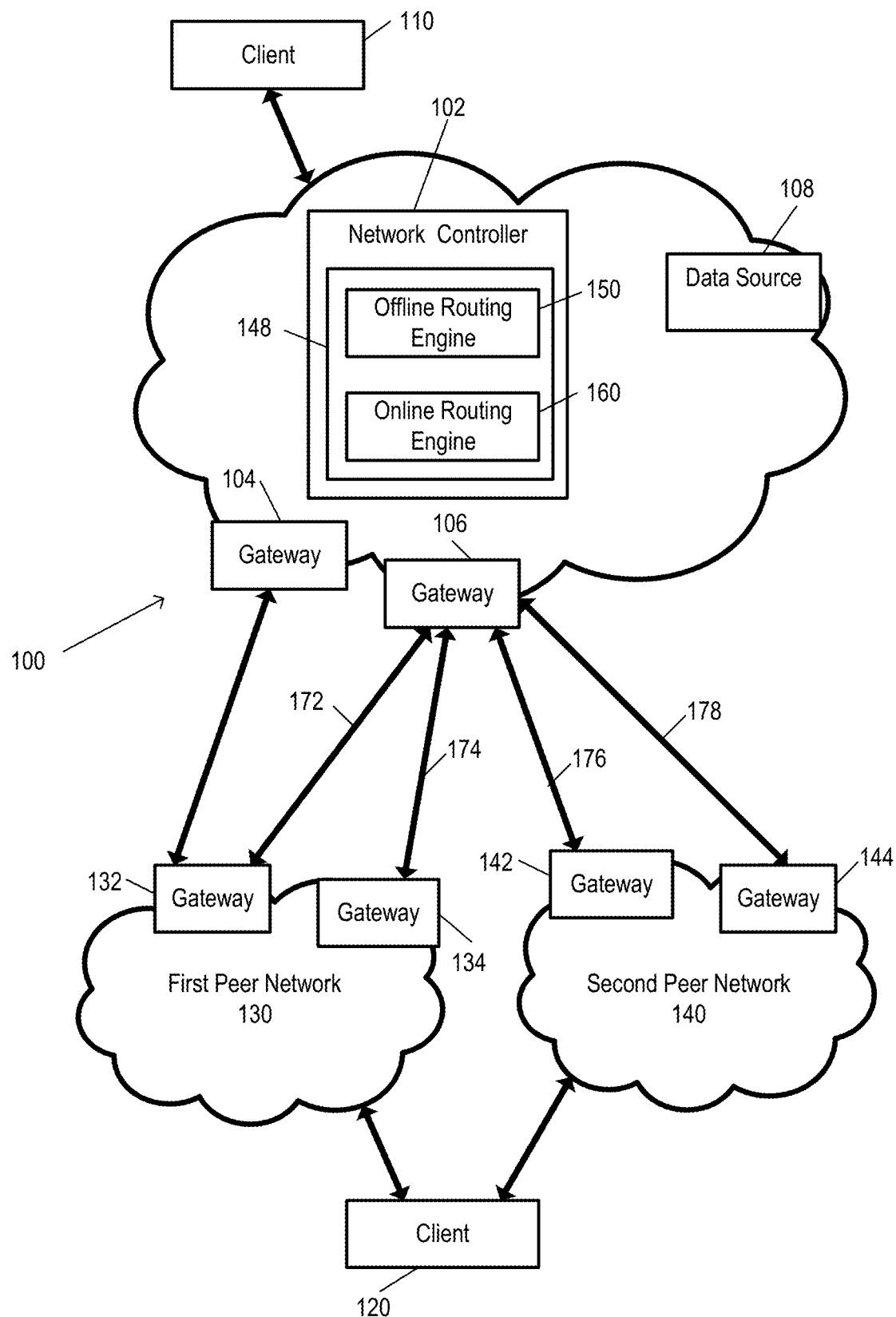
FIG. 1 shows a block diagram of an example of a traffic engineering system in which a network controller may be implemented, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a network controller configured to efficiently allocate bandwidth among communication links to peer networks while meeting various constraints, such as maximum latency of a communication link (or end-to-end latency), minimum bandwidth over a communication link (or end-to-end bandwidth), and/or reduced peering rates for one or more communication links. The network controller manages flows of packet data ("traffic flows") from a first network to one or more peer networks via one or more gateways. In some embodiments, the traffic flows represent inter-domain traffic, which may be exchanged between a cloud wide area network (WAN) and other peer networks on the Internet (e.g., ISPs). Although gateways typically utilize a routing protocol such as border gateway protocol (BGP), the network controller is configured to override BGP's best-path selection, to steer egress traffic to better performing gateways in the peer networks, in some embodiments.

Bandwidth allocations at network edges impact both the client latency and inter-domain bandwidth costs to the network provider. At one extreme, traffic allocations may disregard the latency impact to drive bandwidth costs to near-zero while at the other extreme, allocations may incur very high bandwidth costs by greedily assigning traffic to the lowest latency peers. Determining an acceptable balance is made challenging by industry-standard peering rate schemes that use 95th percentile of the bandwidth distribution over monthly time-periods. A percentile is a score below which a given percentage of scores in its frequency distribution fall (using an "exclusive" definition) or a score at or below which a given percentage fall (using an "inclusive" definition). For example, a 50th percentile (the median) is the score below which 50% (exclusive) or at or below which (inclusive) 50% of the scores in a distribution may be found. In the case of 95th percentile bandwidth distributions, 95% of the time during a usage cycle has usage below this amount, while the remaining 5% of the time, the usage is above that amount. In some scenarios for billing, the top 5% of bandwidth peaks in each month are cut off and the usage is billed at the nearest rate. In this way, infrequent peaks are ignored and the customer is charged in a fairer way. Complex relationships between bandwidth allocations, costs and client latency lead to computationally hard optimization problems. However, a large portion of the benefits may be obtained even when limiting the problem space to a small number of transit ISPs that handle most traffic demands.

This and many further embodiments for a network controller are described herein. For instance, FIG. 1 shows a traffic engineering system 100 configured to route traffic (i.e., packet data) through various communication links, in accordance with an example embodiment. As shown in FIG. 1, traffic engineering system 100 ("system 100") includes a network controller 102 and one or more gateways, such as gateway 104 and gateway 106, that are communicatively coupled by communication links (not shown) to form a network, such as a wide area network (WAN), a local area network (LAN), enterprise network, etc. The communication links may include one or more of wired and/or wireless portions. These features of FIG. 1 are described in further detail as follows.

In various embodiments, the system 100 is configured to provide network and/or cloud services to client devices, such as client 110 and client 120. Examples of the services provided by the system 100 include data storage and retrieval, online document editing and management, audio and/or video conferencing, software as a service ("SaaS"), or other suitable services. In some embodiments, the system 100 includes one or more data stores, such as data source 108, that store or generate data to be provided to the clients 110 and/or 120 as part of the provided services. In various embodiments, the data source 108 is a network server, cloud server, video conferencing server, network attached storage ("NAS") device, or other suitable computing device. Data source 108 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Although only one data source 108 is shown in FIG. 1, the system 100 may include two, three, or more similar data sources. Moreover, the system 100 may provide access to other data sources, similar to data source 108, that are located outside of the system 100, in some embodiments.

In various embodiments, the clients 110 and 120 are configured to transmit and/or receive packet data via the system 100, such as audio data, video data, electronic document data, management or diagnostic data, or other suitable data. In the description provided herein, the client 110 acts as a "data source" and transmits packet data to the system 100 and the system 100 is configured to route the packet data towards the client 120 (a "destination" of the packet data). In other scenarios, the client 120 is a data source and the client 110 is a destination, or both clients 110 and 120 act as data sources and destinations. Although only two instances of the clients 110 and 120 are shown for clarity, the system 100 may serve hundreds or thousands of clients, in other embodiments. Clients 110 and 120 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer, network server, or other suitable computing device. Clients 110 and 120 may be configured to execute one or more software applications (or "applications") and/or services and/or manage hardware resources (e.g., processors, memory, etc.), which may be utilized by users (e.g., customers) of the clients 110 and 120.

Clients of the system 100 may be directly communicatively coupled with the system 100, or indirectly communicatively coupled with the system 100 via one or more intermediate networks or communication links. In the embodiment shown in FIG. 1, the client 110 is directly communicatively coupled to the system 100, while the client 120 is indirectly communicatively coupled to the system 100 by a first peer network 130 and a second peer network 140. In other embodiments, clients of the system 100 may be communicatively coupled with the system 100 through any number of communication links.

The gateways 104 and 106 are located at an edge of the system 100 and act as an interface between the system 100 and peer networks, such as the first peer network 130 and second peer network 140. In some embodiments, the gateways 104 and 106 are Points of Presence (POPs) for the system 100 and implement at least some of the Border Gateway Protocol (BGP) to exchange routing and reachability information with the peer networks 130 and 140. One or more of the gateways 104 and 106 are implemented as software-defined edges that provide fine-grained control of outbound path selection from the system 100. In some embodiments, the peer networks 130 and 140 are transit ISPs that provide data transfer services over long-haul communication paths. In various embodiments, the peer networks 130 and 140 serve geographical areas of various sizes, for example, a town, corporate campus, metropolitan region, state, country, or even continents (e.g., spanning the Pacific Ocean). The peer networks 130 and 140 may correspond to transit networks, access networks, content providers, and/or Internet Exchange Points (IXPs), in various embodiments.

The gateways 104 and 106 may be communicatively coupled with each other, the network controller 102, and/or the data source 108 by one or more internal (i.e., within the system 100) communication links (not shown). The gateways 104 and 106 may also be communicatively coupled with gateways of the first peer network 130 and second peer network 140 by a plurality of communication links ("edge links"). In the embodiment shown in FIG. 1, the gateway 106 is communicatively coupled with a gateway 132 of the first peer network 130, a gateway 134 of the first peer network 130, a gateway 142 of the second peer network 140, and a gateway 144 of the second peer network 140 by communication links 172, 174, 176, and 178, respectively. Although the communication links 172, 174, 176, and 178 are shown as a single link for clarity, in some embodiments one or more of the communication links 172, 174, 176, and 178 are implemented as a plurality of links, such as optical fibers, coaxial cables, twisted pair cables, or other suitable links. Moreover, in some embodiments, the traffic engineering system 100 may be communicatively coupled with the peer networks by tens, hundreds, or thousands of different communication links with any number of gateways.

For traffic flows of packet data that are to be transmitted to clients via the peer networks 130 and/or 140, the network controller 102 is configured to determine allocations of the traffic flows across the corresponding communication links. In some embodiments, the network controller 102 includes a routing engine application 148 that determines allocations of traffic to communication links. The routing engine application 148 may include an offline routing engine 150 that is configured to determine an allocation of packet data traffic demands to each of the plurality of communication links 172, 174, 176, and 178 using a mixed integer linear programming model. In some embodiments, the routing engine application 148 includes an online routing engine 160 that is configured to determine an allocation of the packet data traffic demands in real-time or near-real-time to each of the plurality of communication links 172, 174, 176, and 178. In other embodiments, the routing engine application 148 includes both the offline routing engine 150 and the online routing engine 160. Although not shown in FIG. 1, in some embodiments, the gateway 104 and/or gateway 106 include an instance of the routing engine application 148 (e.g., the offline routing engine 150 and/or the online routing engine 160). In other embodiments, the network controller 102 is integral with one or more of the gateways 104 or 106.

In some embodiments, two or more of the network controller 102, the gateway 104, the gateway 106, and/or the data source 108 may be co-located (e.g., housed in one or more nearby buildings with associated components such as backup power supplies, redundant data communications, environmental controls, etc.) to form a datacenter, or may be arranged in other manners.

The above embodiments, and further embodiments, are described in further detail in the following subsections.

Figure 2:
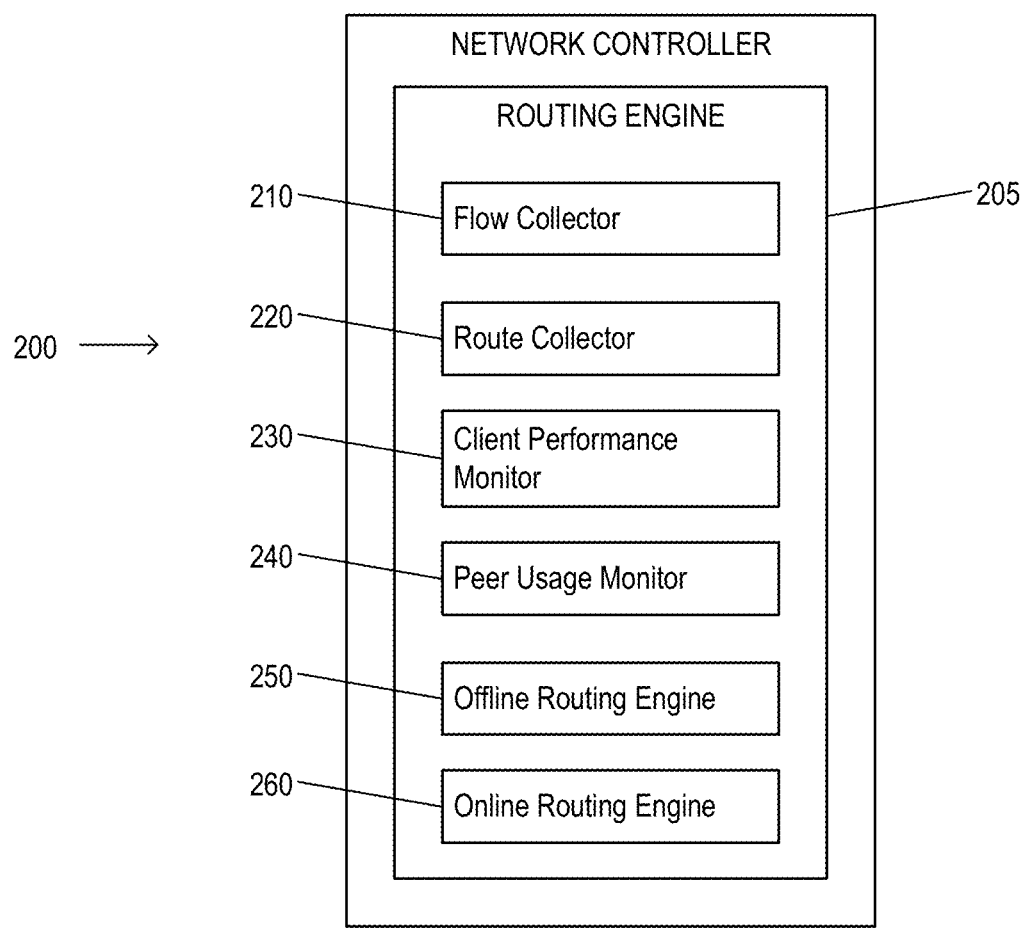
FIG. 2 shows a diagram of an example network controller, according to an example embodiment.

FIG. 2 shows a diagram of an example network controller 200, according to an example embodiment. In some embodiments, the network controller 200 is a wide area network (WAN) controller and implements the network controller 102 of the traffic engineering system 100. In various embodiments, the network controller 200 includes a flow collector 210, a route collector 220, a client performance monitor 230, a peering usage monitor 240, an offline routing engine 250, and an online routing engine 260. In the embodiment shown in FIG. 2, the flow collector 210, route collector 220, client performance monitor 230, peering usage monitor 240, offline routing engine 250, and online routing engine 260 are implemented as portions of a routing engine application 205. In other embodiments, one or more portions of the routing engine application 205 are implemented in separate applications or program modules, in hardware, circuitry, etc.

The flow collector 210 is configured to receive Internet Protocol flow information from routers, probes and other devices that are used by mediation systems, accounting/billing systems, and network management systems to facilitate services such as measurement, accounting, and billing.

The flow collector 210 provides suitable flow information to the offline routing engine 250 and/or online routing engine 260 to infer the utilization of edge links of the system 100 in suitable intervals of a usage cycle (e.g., five minute intervals of a monthly billing cycle). In some embodiments, the flow collector 210 is an Internet Protocol Flow Information Export (IPFIX) flow collector and implements at least some of Internet Engineering Task Force (IETF) standard RFC 3917.

The route collector 220 is configured to receive route announcements made by BGP peers at points of presence of the system 100 using BGP Monitoring Protocol (BMP) collectors. These routes inform the offline routing engine 250 and the online routing engine 260 of available choices of communication links for outbound demand towards clients (e.g., the communication links 172, 174, 176, and 178 toward client 120).

Client performance monitor 230 is configured to determine a median latency to clients of the system 100 over both primary and alternate BGP paths at the gateways 104 and 106. In some embodiments, the client performance monitor 230 determines other flow information for the communication links, such as available bandwidth.

The peering usage monitor 240 is configured to provide peering rates for the gateways 132, 134, 142, and 144 of the peer networks 130 and 140 to the offline routing engine 250 and the online routing engine 260. In some embodiments, the peering rates indicate a cost for data transfers at a particular speed, for example, a cost per megabit per second (Mbps) of bandwidth over a communication link. In various embodiments and/or scenarios, the peering rates are provided as a portion of a peering contract having multiple tiers of peering rates for different available bandwidths and/or data caps. In some scenarios, the peering rates are non-linear and increase step-wise at various data caps, for example, $4 per Mbps for 10 terabits, $6 per Mbps for 15 terabits, $10 per Mbps for 20 terabits, and so on. In some embodiments, the peering usage monitor 240 supports a burstable billing model for the communication links.

The offline routing engine 250 is configured to, based on a mixed integer linear programming (MILP) model, determine an allocation of packet data traffic demands to a plurality of communication links (e.g., the communication links 172, 174, 176, and 178) during a usage cycle. In the embodiments described herein, the usage cycle is a monthly billing period and the network controller 200 is configured to divide the usage cycle into a plurality of timeslots of, for example, 5 minutes, 10 minutes, etc.

More specifically, in an embodiment, the offline routing engine 250 is configured to formulate the MILP model as follows:

Inputs:
  n: number of five-minute timeslots in a usage cycle
  m: number of peering links in the system 100
  $P_i$: Peering link i, $i \in [1, \ldots m]$
  $C_i$: capacity of peering link $P_i$
  $c_i$: peering rate (USD/Mbps) for link $P_i$
  $d_j$: egress flow from the WAN in $t_j$, $j \in [1, \ldots, n]$ $$k = \frac{n}{20}$$

M: large integer constant
Outputs:
  $x_{ij}$: traffic allocation to link $P_i$ in timeslot $t_j$
  $\lambda_{ij}$: binary constraints that discount top k values of $x_{ij}$
  $z_i$: billable bandwidth on link $P_i$
Minimize: $\Sigma_i Z_i C_i$ subject to:
  $\forall i, 0 \leq x_{ij} \leq C_i$; (as capacity constraints)
  $ij \in \{0, 1\}$; (as binary constraints)
  $\forall j, \Sigma_i x_{ij} = d_j$; (as demand constraints)
  $\forall i, \Sigma_j \lambda_{ij} = k-1$
  $\forall j, z_i > x_{ij} - M^*\lambda_{ij}$ In this model, n corresponds to the plurality of timeslots into which the usage cycle has been divided by the network controller 200 and the peering links generally correspond to links 172, 174, 176, and 178. Many ISPs utilize peering rates that are based on a "95th percentile" of usage, but a cost function consisting of the sum of 95th percentile utilization of links is non-convex. In the above-described model, the exact 95th percentile of traffic allocations is formulated as part of an objective function where the 95th percentile of a distribution of n timeslots is the same as their k-max where k=n/20.

In an embodiment, the offline routing engine 250 is configured to avoid negative feedback by avoiding usage thresholds that trigger negative feedback, such as a 95th percentile of usage that triggers a shift to a higher tier of cost, a lower tier of quality of service (QoS), or lower bandwidth, etc. In some embodiments, the offline routing engine 250 is configured to find a traffic assignment to edge links over the entire usage cycle such that total inter-domain bandwidth costs are minimized, where bandwidth costs may refer to higher monetary costs, lower QoS, higher latencies, reduced bandwidth, and the like. As an example, the cost incurred on peering link $P_i$ is the product of the peering rate ($c_i$) and the 95th percentile utilization of that link (denoted by $z_i$). In this scenario, one goal is to minimize the total cost incurred across all links in the system 100 according to:

$$\text{minimize } Z = \sum_{i=1}^{m} c_i * z_i$$

The offline routing engine 250 is configured to take advantage of the fact that link utilization during 5% of timeslots do not contribute to its 95th percentile cost. This means that 5% of time in any usage cycle is free (or has reduced negative feedback) regardless of the traffic it carries. This factor is incorporated into the model using binary integer variables $\lambda_{ij}$ for each decision variable $x_i$. $\lambda_{ij}$s are also decision variables of the optimization which reflect whether their corresponding $x_{ij}$ values contribute to the link cost. This is expressed with the indicator constraint:

$$(\lambda_{ij}=0) \Rightarrow z_i \geq x_{ij}, \forall i,j$$

Since 5% of all $x_{i1}$, $x_{i1}$, $x_{i2}$, . . . , $x_{in}$ may have their corresponding $\lambda_{ij}$ with a value of zero, which prioritizes this subset of timeslots by effectively removing their corresponding negative feedback, the reduced cost is expressed using Big-M constraints in the formulation. The minimization objective ensures that of all $\lambda_{ij}$s, the ones corresponding to the top k−1 of the allocations $x_{ij}$ at a link do not contribute to its cost.

Some steps performed by the offline routing engine 250 may take a significant amount of time (e.g., several hours or more) to perform and as such, are generally performed "offline" or without regard to current traffic flows. However, the allocation determined by the offline routing engine 250 may provide a useful lower bound that may be utilized by the online routing engine 260 to improve its efficiency (e.g., a speed with which it determines allocations). On the other hand, in some embodiments, the allocation determined by the offline routing engine 250 may be used to reconfigure the gateways of the system 100.

In some embodiments, the offline routing engine 250 determines an allocation using the above-described MILP for only a subset of the available communication links, for example, to improve the speed with which an allocation may be determined or to comply with other constraints (e.g., a software compatibility issue or configuration issue between the network controller 102 and gateway 104). In an embodiment, for example, the offline routing engine 250 determines the allocation for only those communication links that correspond to a subset of the peer networks (e.g., only the first peer network 130). In one such example, the offline routing engine 250 determines the allocation for only transit ISP networks. In another embodiment, the offline routing engine 250 determines the allocation for only those communication links that correspond to a subset of the communication links associated with gateways that are able to be reconfigured by the network controller 200.

The online routing engine 260 is configured to allocate network flow to peer links, but in contrast to the offline routing engine 250, the online routing engine 260 allocates flows without knowledge of future demands and with a suitably fast speed to enable real-time or near-real time solutions. In some examples, the online routing engine 260 performs an allocation of traffic for each timeslot of a usage cycle (e.g., every five minutes). The online routing engine 260 is configured to predetermine respective base bandwidths for each communication link as a fraction of an estimated total bandwidth or network capacity that will be billable bandwidth for a usage cycle as $C_f$. Given the billable bandwidth, the online routing engine 260 is configured to find an "optimal" predetermined 95th percentile utilization $u_j$ of link $l_j$ using a bin-packing algorithm. Thus, greedy assignment of $C_f$ to communication links in an increasing order of their peering rates helps to minimize exposure to negative feedback and, in some examples, reduces the total bandwidth cost of the system 100. Since some subsets of links ($L_i \subset L$) may have a same peering rate, the online routing engine 260 assigns $u_j$ to links in the same subset using a progressive filling algorithm to ensure max-min fairness within link subsets. When a usage cycle begins, every link has a 95th percentile utilization ($u_i$) assigned to it. As new outbound demands arrive, if they can be met with $\Sigma u_i = C_f$ capacity, the online routing engine 260 allocates corresponding flows to the links. However, when the outbound demand exceeds $C_f$, the online routing engine 260 is configured to utilize one or more communication links at near full capacity to meet the demand for that timeslot. Since 5% of timeslots of a usage cycle do not contribute to the links' costs, the online routing engine 260 is configured to ensure that a given link is only allocated excess demand up to maximum capacity for 5% or fewer timeslots.

Figure 3:
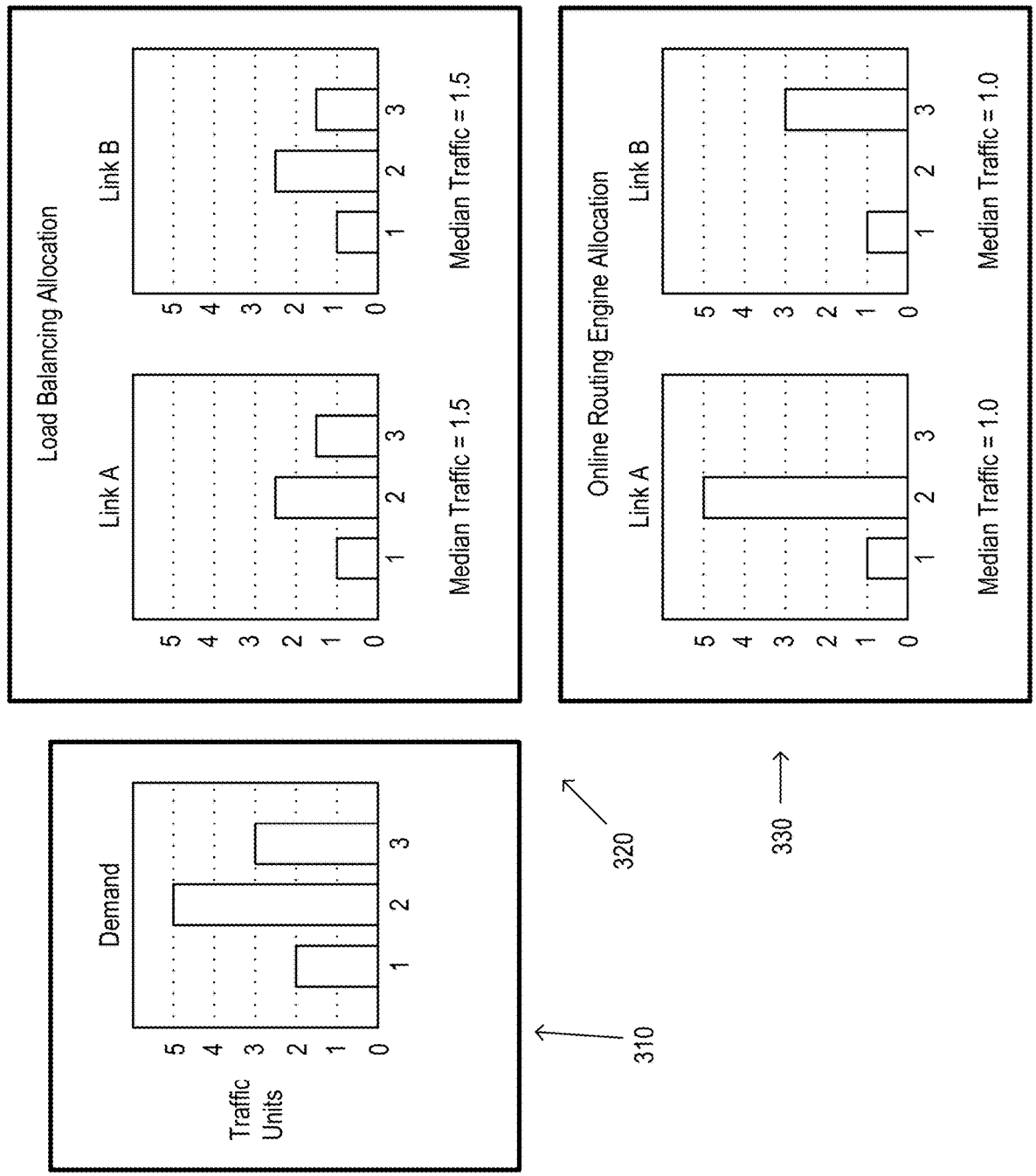
FIG. 3 shows a diagram of example traffic allocations for peer networks, according to an example embodiment.

FIG. 3 shows a diagram of example traffic allocations 320 and 330 for peer networks, according to an example embodiment. The traffic allocation 320 and the traffic allocation 330 are generated based on a traffic demand scenario 310 for two communication links (Link A, Link B) over three timeslots (1, 2, 3). In the embodiment shown in FIG. 3, the communication links are billed by the median of their utilization and the traffic demand scenario 310 requires a total of 2 traffic units during the first timeslot, 5 traffic units during the second timeslot, and 3 traffic units during the third timeslot for outbound demand. In this example, the number of traffic units corresponds to a bandwidth in Mbps during the corresponding timeslot, but other units of traffic may be used in other embodiments.

The traffic allocation 320 represents a typical load balancing allocation where traffic is allocated predominantly according to load levels of the corresponding links and/or gateways. In this example, the links A and B are equally loaded and so each receives half of the traffic demand over the three timeslots (1, 2.5, and 1.5 traffic units over timeslots 1, 2, and 3). In this example, the load balancing allocation results in a median of 1.5 over each of links A and B, for a cumulative median of 3 traffic units.

The traffic allocation 330 represents an allocation determined by the online routing engine 260, in an embodiment. In this example, the traffic allocation 330 results in an allocation of 1 traffic unit, 5 traffic units, and zero traffic units over link A during the three time slots, while link B receives one traffic unit, zero traffic units, and 3 traffic units during the three timeslots. As seen in this example, in case of median billing, one of the three timeslots does not contribute towards a final cost of the corresponding link. Each link has one "free" slot having removed negative feedback, which is utilized to absorb peaks in demands and may reduce the overall cost for handling the traffic demands and/or reduce negative feedback. In this example, the median allocation is 1.0 traffic units for link A and 1.0 traffic units for link B, for a cumulative median of 2 traffic units.

In a similar manner to the example of FIG. 3, when bandwidth over communication links 172, 174, 176, and 178 is priced using 95th percentile billing or when negative feedback is introduced at a similar threshold, this allows for 5% of the timeslots in a given usage cycle to be "free" for each communication link. Accordingly, for a monthly usage cycle and 5 minute timeslots, roughly 36 hours in a month of traffic allocation on any communication link does not contribute to the final billed cost. In scenarios where gateways of the system 100 have a wide variety of communication links to peer networks that are reasonably close in performance (e.g., within a predetermined acceptable range for latency or "latency equivalent"), these free timeslots over the communication links allow for reduced peering rates, improved available bandwidth, or improved QoS for handling the traffic demand.

Figure 4:
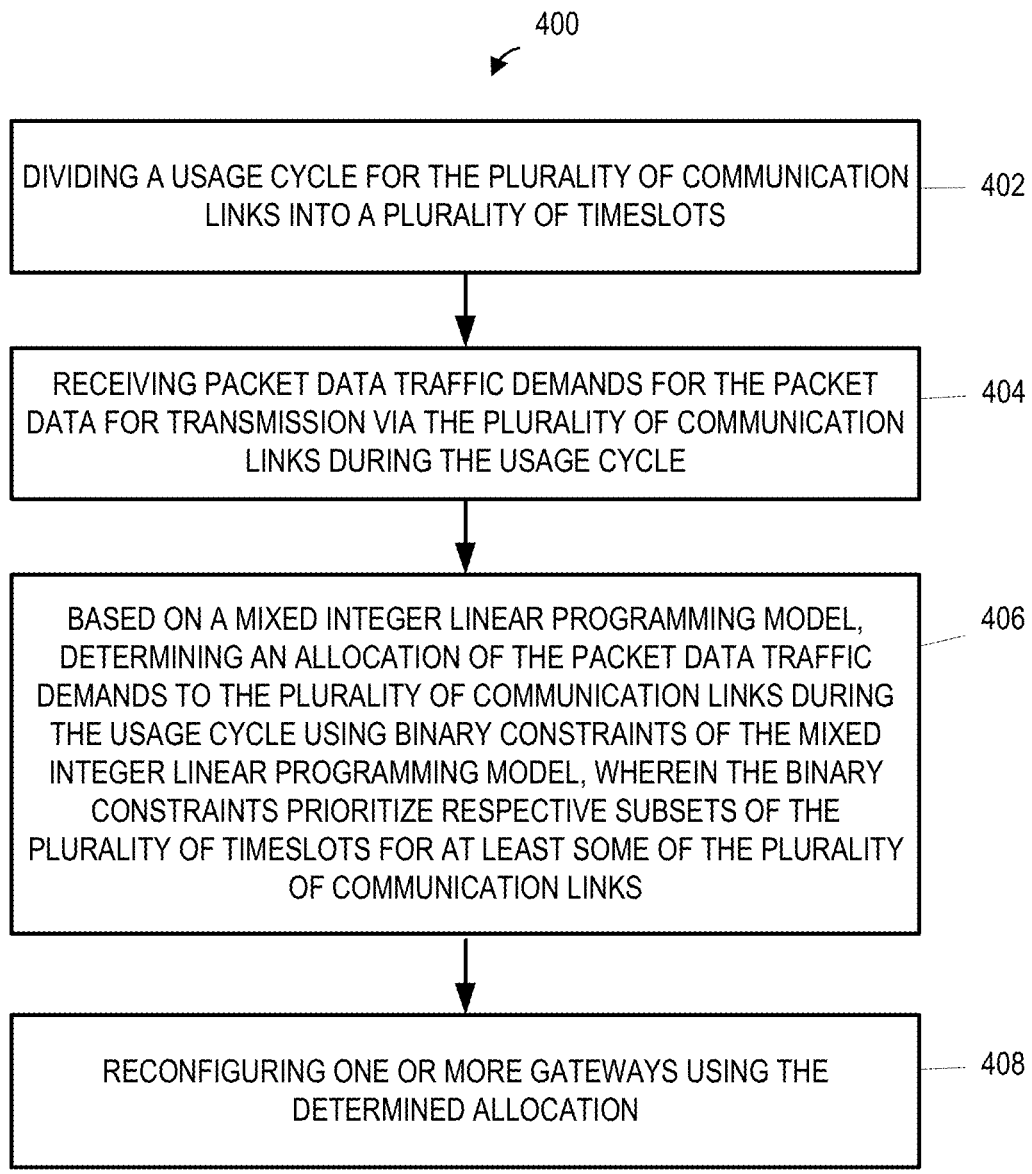
FIG. 4 shows a flowchart of an example method of routing packet data to be transmitted via a plurality of communication links, according to an example embodiment.

FIG. 4 shows a flowchart of an example method 400 of routing packet data for transmission via a plurality of communication links, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 4. Steps may be performed serially, in a partially overlapping manner, or fully in parallel. Thus, the order in which steps of method 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the network controller 102 (e.g., via the offline routing engine 150), the network controller 200 (e.g., via the offline routing engine 250), the gateway 104, the gateway 106, or other suitable computing device.

Method 400 begins with step 402. In step 402, a usage cycle for the plurality of communication links is divided into a plurality of timeslots. The plurality of communication links correspond to the communication links 172, 174, 176, and 178, in an embodiment. The usage cycle may be any suitable time period, for example, one week, two weeks, one month, etc., while the timeslots may have durations of 2 minutes, 5 minutes, 10 minutes, or other suitable duration. In some embodiments, the predetermined number of timeslots is a predetermined percentage of the plurality of timeslots, for example, 5% of the timeslots. In an embodiment, at least some of the plurality of communication links are coupled with different internet service providers, for example, different transit ISPs or the first peer network 130 and the second peer network 140.

In step 404, packet data traffic demands for the packet data for transmission via the plurality of communication links are received. In an embodiment, the traffic demands are similar to the traffic demand scenario 310, but correspond to the communication links 172, 174, 176, and 178, for example Although the traffic demand scenario 310 only includes a number of traffic units, in some scenarios, the traffic demands further include additional constraints, such as a maximum latency.

In step 406, based on a mixed integer linear programming model, an allocation of the packet data traffic demands to the plurality of communication links during the usage cycle is determined using binary constraints of the mixed integer linear programming model, where the binary constraints prioritize respective subsets of the plurality of timeslots for at least some of the plurality of communication links. The MILP model generally corresponds to the MILP model described above with respect to FIG. 2. The binary constraints correspond to $\lambda_{ij}$, discussed above. In other words, when the $\lambda_{ij}$ has a value of zero, the i-th communication link may be considered to have a "free" peering rate during the j-th timeslot. In some embodiments, the mixed integer linear programming model is configured to use the binary constraints to prioritize the ones of the plurality of communication links by removing, from the mixed integer linear programming model, negative constraints for the ones of the plurality of communication links for the predetermined number of the plurality of timeslots, where the negative constraints are associated with negative feedback during the usage cycle.

In some embodiments, at least some timeslots within the respective subsets of the plurality of timeslots for different communication links do not overlap. In other words, timeslots having a "free" peering rate need not be the same timeslot for different communication links.

In some embodiments, step 406 also includes determining a lower bound of the MILP model by relaxing the binary constraints that remove the negative feedback and solving the mixed integer linear programming model. Removing the binary constraints vastly improves the speed with which an initial solution can be determined (when such a solution actually exists). Optimization solvers may use a combination of techniques to solve general Mixed Integer Programs (MIPs). At a high level, the first step is "relaxing" the MIP to an efficiently solvable Linear Program (LP) by removing the integral constraints. If a feasible solution to the LP is not found, the MIP, in turn, is also infeasible. If a feasible solution is found, the solution of the LP is a lower bound to the solution of the original MP. Therefore, in a minimization problem based on the MILP model, the relaxed LP solution provides the lower bound on bandwidth cost without having to solve the MILP.

Once the LP relaxation has been solved, MIP solvers use a branch-and-bound strategy to find feasible solutions to the MIP from an exponential number of possibilities. As a result, some instances of the branch and bound strategy can take several hours to solve. In some scenarios, using the efficiently computable LP relaxation, the proximity of the MIP solution to the theoretical lower bound is determined and the branch-and-bound algorithm is configured to return the current best feasible solution after a fixed amount of time has elapsed (e.g., 5, 10, 15 hours or other suitable duration). In some scenarios, the solver is configured to stop if the current best feasible solution to the MIP is within 15% of the LP optimal or if the solver has run for 15 hours.

In some scenarios, the MILP model is solved by implementing the formulations using a CVX framework (CVX Research, Software for Disciplined Convex Programming, http://cvxr.com) and solving with a commercial optimization solver, such as Gurobi (GUROBI Optimization, https://www.gurobi.com/), GNU Linear Programming Kit (LPK, https://www.gnu.org/software/glpk/), CPLEX Optimizer (IBM, https://www.ibm.com/analytics/cplex-optimizer), or other suitable linear programming application. In an embodiment, solving the MILP model includes performing a branch and bound algorithm to obtain a solution that is within a fraction of the lower bound. The fraction may be any suitable value that reduces the amount of time needed to calculate the solution, for example, $\frac{1}{10}$ to obtain a solution within 10% of the lower bound. In some scenarios, the MILP model is configured or initialized using values of decision variables for a prior usage cycle.

The negative feedback may take many different forms, in various embodiments. In one embodiment, the negative feedback is a reduced available bandwidth on the corresponding communication link during the predetermined number of timeslots. In another embodiment, the negative feedback is an increased peering rate on the corresponding communication link during the predetermined number of timeslots. In some scenarios, the increased peering rate corresponds to an increased peering rate on the corresponding communication link during each of the plurality of timeslots (i.e., an increased peering rate for the entire usage cycle).

In step 408, for each of the plurality of timeslots, one or more gateways that correspond to the plurality of communication links to route the packet data using the determined allocation of the packet data traffic demands.

In some embodiments, the gateways correspond to the gateways 104 and/or 106.

In some embodiments, the method 400 further includes receiving traffic demands as estimated future values based on one or more prior usage cycles. In an embodiment, for example, the network controller 200 receives an estimate of traffic demands based on a same usage cycle from a prior year (i.e., an estimate for March of 2021 based on March of 2020).

Figure 5:
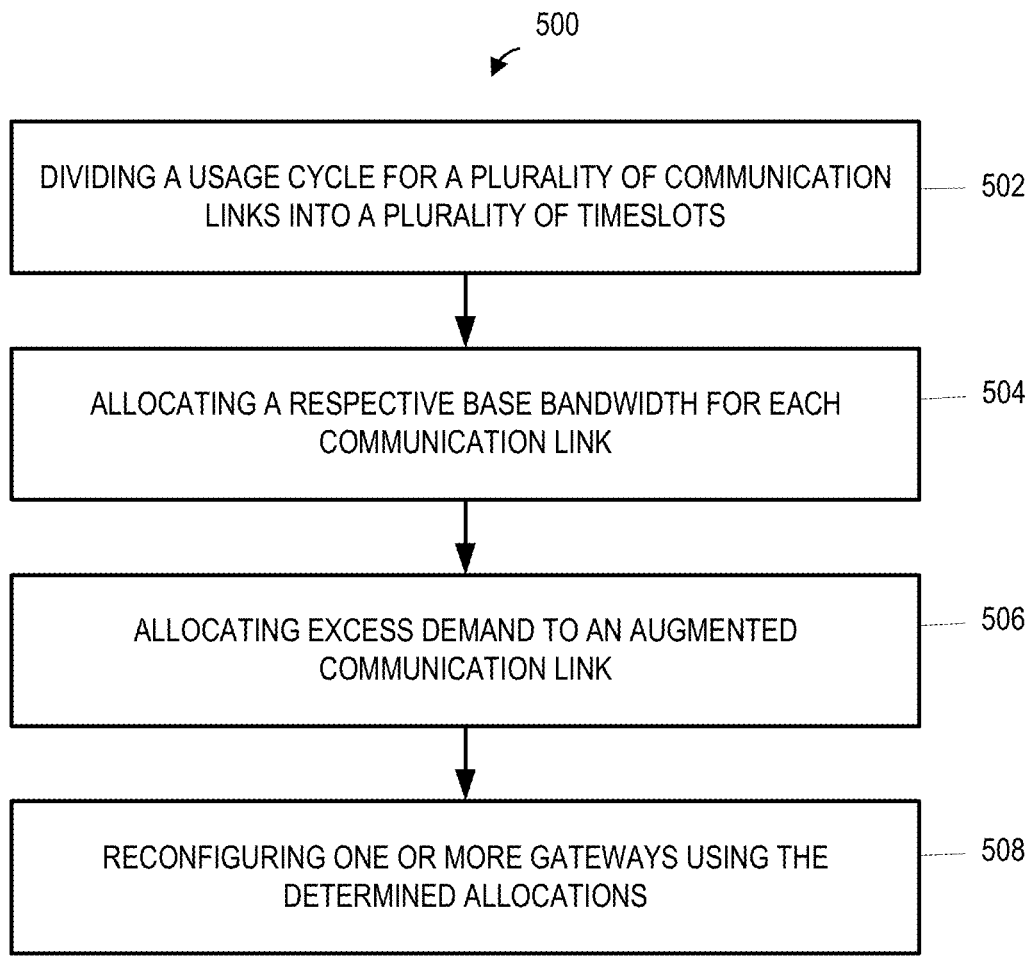
FIG. 5 shows a flowchart of another example method of routing packet data to be transmitted via a plurality of communication links, according to an example embodiment.

FIG. 5 shows a flowchart of another example method 500 of routing packet data to be transmitted via a plurality of communication links, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the network controller 102 (e.g., via the online routing engine 160), the network controller 200 (e.g., via the online routing engine 260), the gateway 104, the gateway 106, or other suitable computing device.

Method 500 begins with step 502. In step 502, a usage cycle for the plurality of communication links is divided into a plurality of timeslots. The plurality of communication links correspond to the communication links 172, 174, 176, and 178, in an embodiment. The usage cycle may be any suitable time period, for example, one week, two weeks, one month, etc., while the timeslots may have durations of 2 minutes, 5 minutes, 10 minutes, or other suitable duration. In some embodiments, the predetermined number of timeslots is a predetermined percentage of the plurality of timeslots, for example, 5% of the timeslots. In an embodiment, at least some of the plurality of communication links are coupled with different internet service providers, for example, different transit ISPs or the first peer network 130 and the second peer network 140.

In step 504, allocations of respective base bandwidths are determined for each communication link of the plurality of communication links. The respective base bandwidths are selected as a fraction of an estimated total bandwidth for the usage cycle over the plurality of communication links. In some embodiments, allocating the respective base bandwidth includes allocating the respective base bandwidth using a bin-packing algorithm. In some embodiments, allocating the respective base bandwidth includes using a progressive filling algorithm within subsets of communication links having a same peering rate. In other words, when several communication links have a same peering rate, the online routing engine 260 groups those links together and uses the progressive filling algorithm to allocate traffic among the group. In some embodiments, allocating the respective base bandwidth includes allocating the respective base bandwidth to communication links in an increasing order of peering rates. In other words, the online routing engine 260 allocates the base bandwidth to lower cost links before higher cost links.

In step 506, for each timeslot, when a traffic demand of the timeslot includes excess demand that exceeds the fraction of the estimated total bandwidth, an allocation of the excess demand to an augmented communication link of the plurality of communication links is determined until the augmented communication link has reached full capacity.

In step 508, one or more gateways that correspond to the plurality of communication links are reconfigured to route the packet data using the determined allocations.

In some embodiments, the method 500 further includes selecting the augmented communication link from a priority queue based on a corresponding link capacity and a most recent timeslot that the augmented communication link was allocated excess demand, where the priority queue is configured to include the plurality of communication links. Selecting the augmented communication link may include selecting the augmented communication link for a current timeslot when the augmented communication link was selected for a prior timeslot. Selecting the augmented communication link may also include prioritizing communication links having a lower available bandwidth. In an embodiment, for example, the online routing engine 260 prioritizes communication links having a slower available bandwidth, at least during a first portion of the timeslots, so that communication links having higher bandwidth are available as a "reserve" in case traffic demands escalate significantly in later timeslots.

In some embodiments, the method 500 further includes receiving traffic demands for data to be transmitted via the plurality of communication links during the current timeslot. In other words, the online routing engine 260 receives substantially real-time traffic demands and allocates those demands to the communication links.

In some embodiments, the method 500 further includes increasing the estimated total bandwidth for the usage cycle over the plurality of communication links based on a number of augmented communication links.

The online routing engine 260 is configured to determine the order of communication links to be augmented above their allocation $u_l$ to meet 5-minute demands higher than $C_f$. Using a configurable parameter, the online routing engine 260 may allocate how close the augmented allocation is to the communication link's capacity to prevent sudden link performance degradation. The time slots in which the online routing engine 260 augments the allocation to a link are called augmented slots. The augmented slots are limited to 5% for each link, in an embodiment, making the order in which links are augmented relevant to the feasibility of an allocation. The online routing engine 260 uses a priority queue of all edge links where a link's priority is a combination of the time since it was last augmented and its capacity. If a link was augmented in the previous slot, it is also generally augmented in the following slot, if required, so that the allocations do not change sharply. By prioritizing links with lesser capacity for augmentation, the online routing engine 260 ensures that free slots of links with higher capacity are not used prematurely.

Figure 6:
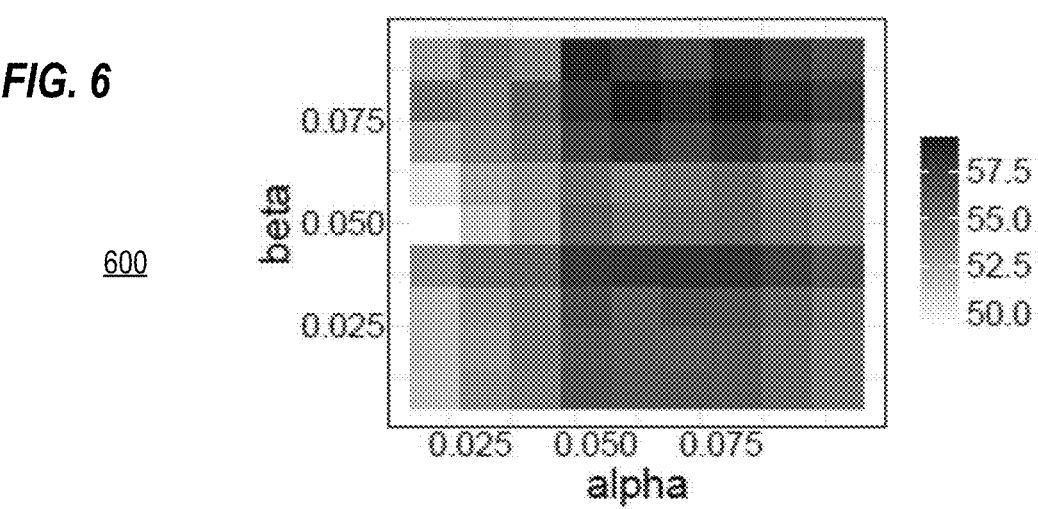
FIG. 6 shows a diagram of an example plot of routing engine parameters, according to an example embodiment.

FIG. 6 shows a diagram of an example plot 600 of variables affecting the fraction of the estimated total bandwidth that will be billable bandwidth for the usage cycle ($C_f$), according to an example embodiment. If the initial capacity fraction assigned by the online routing engine 260 ends up being insufficient to meet the traffic demand in a timeslot, despite augmenting the allocations to all edge links that have free slots remaining, the allocation is considered infeasible and it is no longer possible to limit the bandwidth of this usage cycle to $C_f$. In this scenario, the $C_f$ value is increased. The online routing engine 260 increases the value of $C_f$ by a step size ($\beta$) to meet the traffic demand, in some embodiments. Until it becomes necessary to increase $C_f$ in a billing cycle, the online routing engine 260 generally underutilizes the links to stay under $C_f$. Increasing $C_f$ to $C_f + \beta$ renders prior efforts to keep $C_f$ low, futile. Indeed these efforts may have wasted the augmentation slots of links before $C_f$ is incremented. However, increasing $C_f$ allows for traffic demands to be met. In an ideal case, an initial value of $C_f$ is just enough to meet traffic demands in the entire usage cycle using augmentation slots when needed. On the other hand, starting the usage cycle with a $C_f$ that is higher than required may lead to sub-optimally high bandwidth costs.

When the online routing engine 260 finds that the demand is too high to accommodate in the current $C_f$, it increases $C_f$ by $\beta$. Increasing the billable bandwidth estimate $C_f$ is a tradeoff—increasing too late in the usage cycle leads to wasteful use of links' free slots until the increase and increasing it too early reduces the cost saving potential. The online routing engine 260 models this tradeoff by using a parameter $\alpha$, which is the increase in $C_f$ during the usage cycle before an infeasible allocation is encountered. The goal is to preemptively increase $C_f$ if such an increase is inevitable later in the month.

By setting $C_f$ effectively, the online routing engine 260 may be nearly as effective as the offline routing engine 250. $C_f$ was set to different fractions of the total network capacity, ranging from 0 to 1, in steps of 0.01 and the cost saving from the feasible allocation using the smallest $C_f$ with the optimal cost saving and found that on average, the online routing engine 260 with the optimal initial $C_f$ achieves savings within 2% of the offline routing engine 250.

The online routing engine 260 with the optimal $C_f$ is similar to the offline routing engine 250 since it has prior knowledge of the lowest $C_f$ for feasible allocations. The online routing engine 260 assumes no such knowledge and uses the optimal $C_f$ of the previous usage cycle as the current month's initial $C_f$. This choice is motivated by strong daily, weekly and monthly seasonality in the outbound traffic demands. Previous month's $C_f$ is the optimal value for the next month 64% of the time. For the rest, the average difference between optimal $C_f$ and its initial setting is within a generally practicable range. When the initial $C_f$ is not optimal, the allocation becomes infeasible and the online routing engine 260 has to increase the $C_f$ to meet the traffic demands.

Increase in $C_f$ is a definite increase in the bandwidth cost for the usage cycle. The step size by which $C_f$ is increased ($\beta$) is also important: too high and it would wastefully increase the cost, too low and it would mean having to increase $C_f$ again in the future. Once increased, there is no cost saving advantage to reducing $C_f$. Incrementing $C_f$ later is worse than having started with the optimal $C_f$ since links' augmentation slots are wasted before the increment is made. Thus, preemptively increasing $C_f$ by $\alpha$ during the billing cycle mitigates the issue of wasteful use of link augmentation slots. Estimation of the hyperparameters $\alpha$ and $\beta$ is helpful, so a grid search was performed to find values best suited for a cloud network, with the results shown in FIG. 6.

Figure 7:
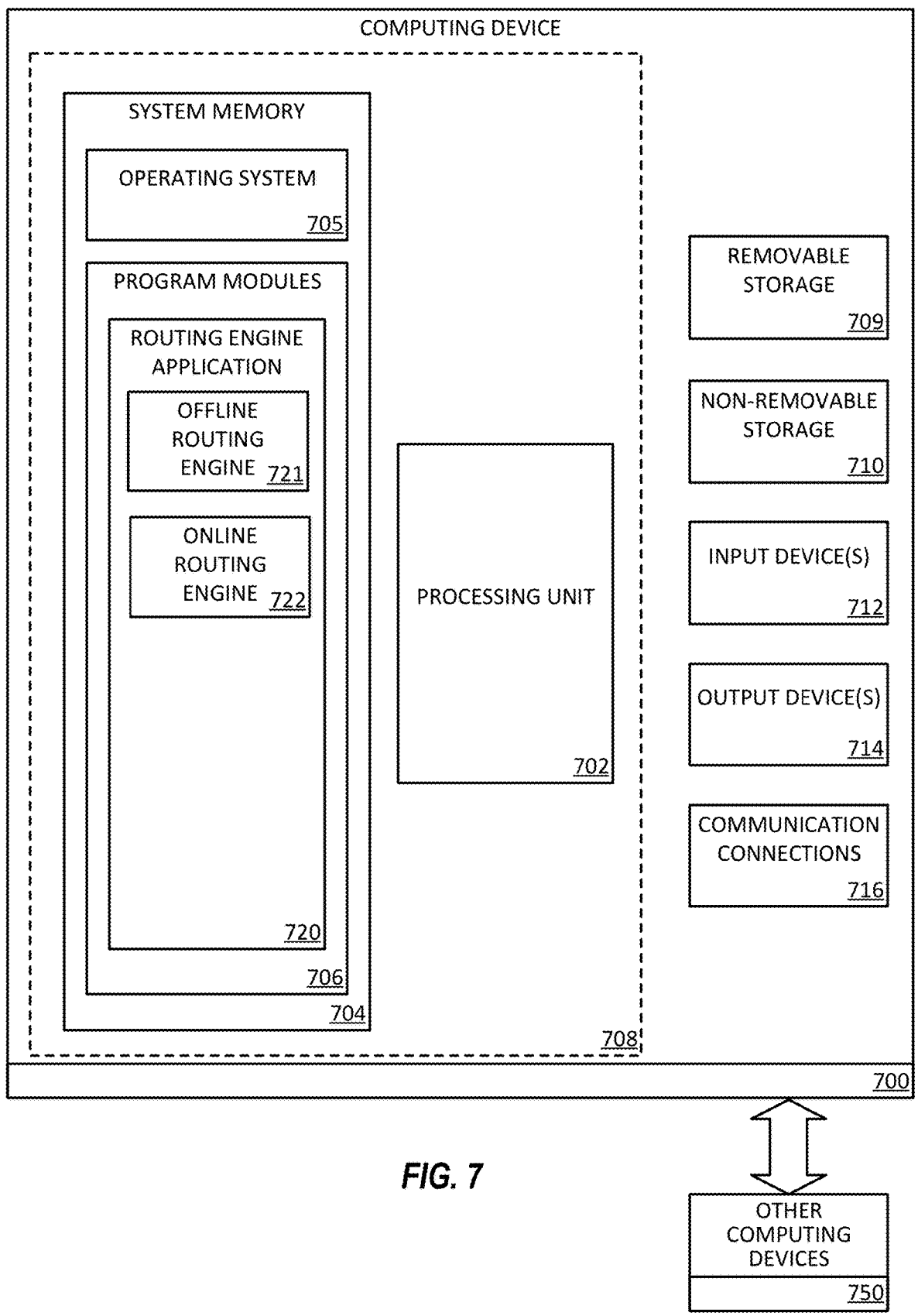
FIG. 7 is a block diagram illustrating example physical components of a computing device with which aspects of the disclosure may be practiced.
Figure 8A:
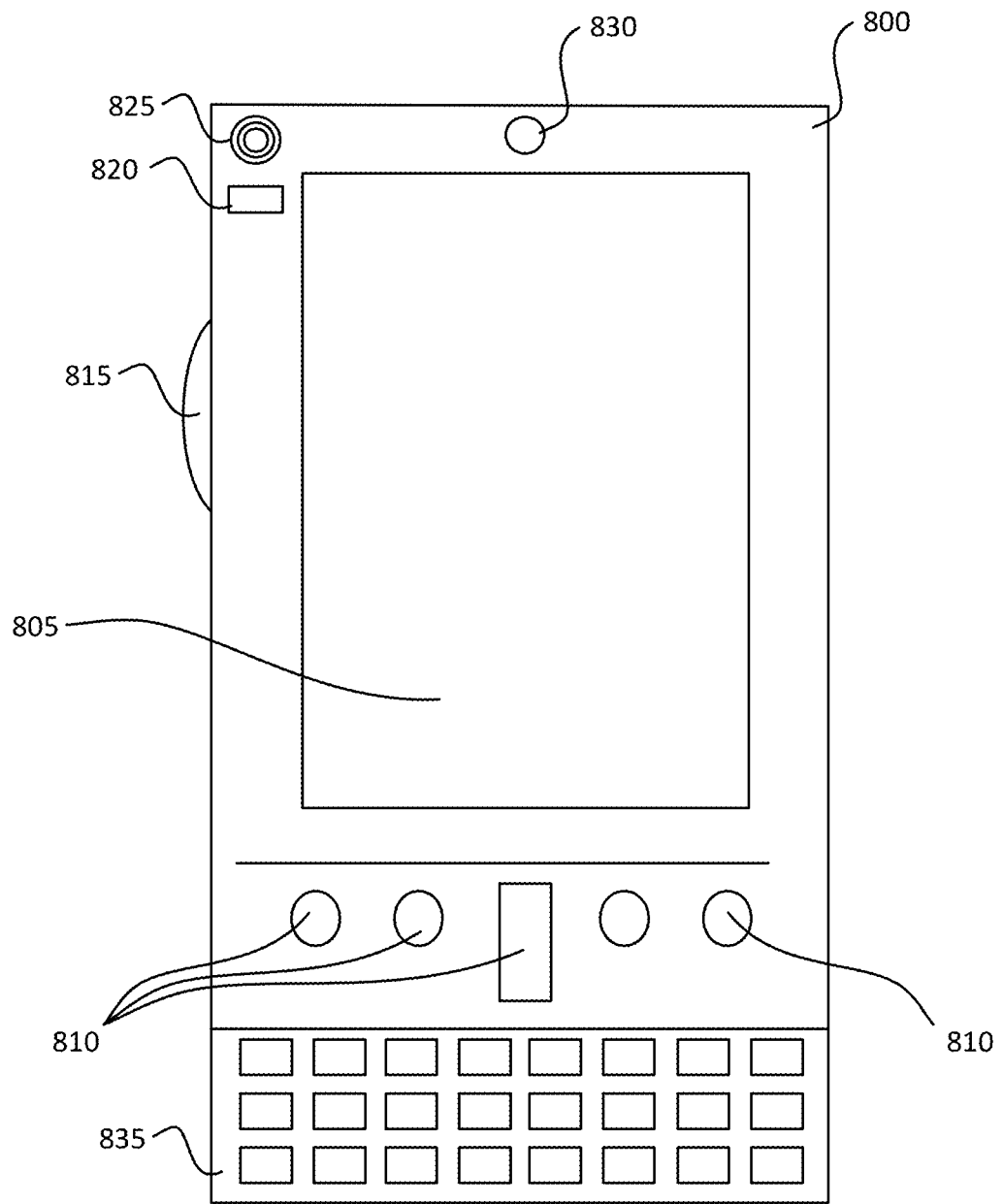
FIGS. 8A and 8B are simplified block diagrams of a mobile computing device with which aspects of the present disclosure may be practiced.
Figure 8B:
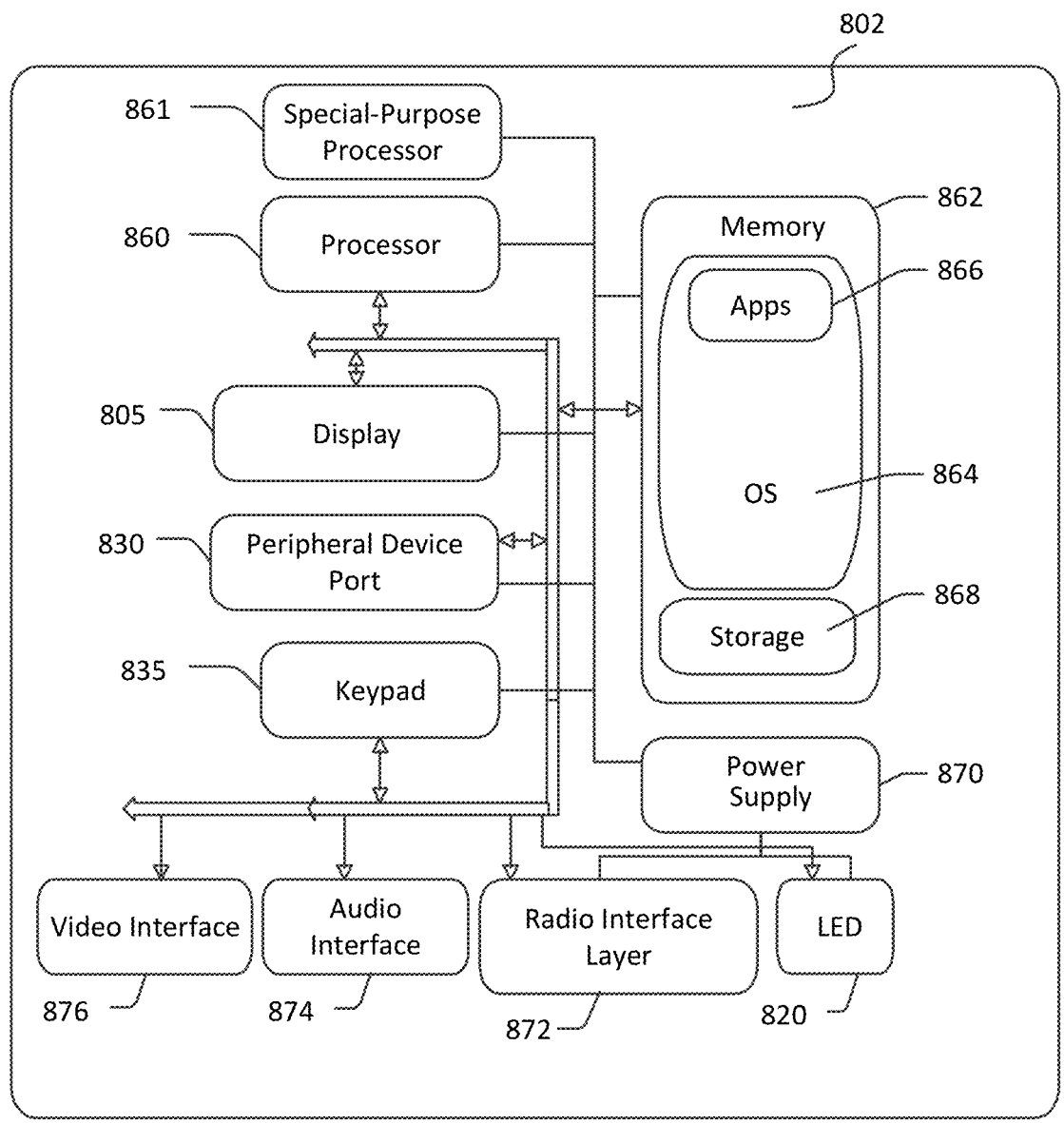

FIGS. 7, 8A, and 8B and the associated descriptions provide a discussion of a variety of operating environments in which aspects of the disclosure may be practiced. However, the devices and systems illustrated and discussed with respect to FIGS. 7-8B are for purposes of example and illustration and are not limiting of a vast number of computing device configurations that may be utilized for practicing aspects of the disclosure, as described herein.

FIG. 7 is a block diagram illustrating physical components (e.g., hardware) of a computing device 700 with which aspects of the disclosure may be practiced. The computing device components described below may have computer executable instructions for implementing a routing engine application 720 on a computing device (e.g., network controller 102, network controller 200, or gateways 104 and 106), including computer executable instructions for routing engine application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running routing engine application 720, such as one or more components with regard to FIGS. 1-2 and, in particular, offline routing engine 721 (e.g., including offline routing engine 150 and/or 250) and/or online routing engine 722 (e.g., corresponding to online routing engine 160 and/or 260). The program modules 706 may include additional components, such as flow collector 210, route collector 220, client performance monitor 230, and/or peering usage monitor 240.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., routing engine application 720) may perform processes including, but not limited to, the aspects, as described herein. Other program modules that may be used in accordance with aspects of the present disclosure, and in particular for allocating traffic to communication links, may include offline routing engine 721 and/or online routing engine 722, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for allocating traffic to communication links (e.g., offline routing engine, online routing engine, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of routing packet data for transmission via a plurality of communication links, the method comprising:

dividing a usage cycle for the plurality of communication links into a plurality of timeslots;

receiving packet data traffic demands for the packet data for transmission via the plurality of communication links;

based on a mixed integer linear programming model, determining an allocation of the packet data traffic demands to the plurality of communication links during the usage cycle using binary constraints of the mixed integer linear programming model, wherein the binary constraints prioritize respective subsets of the plurality of timeslots for at least some of the plurality of communication links for allocating the packet data traffic demands, and a number of timeslots within the respective subsets of the plurality of timeslots is within a predetermined percentage of the plurality of timeslots; and reconfiguring, for each of the plurality of timeslots, one or more gateways that correspond to the plurality of communication links to route the packet data using the determined allocation of the packet data traffic demands.

2. The computer-implemented method of claim 1, wherein allocating the packet data traffic demands includes using the binary constraints to prioritize the ones of the plurality of communication links by removing, from the mixed integer linear programming model, negative constraints for the ones of the plurality of communication links for the predetermined number of the plurality of timeslots, wherein the negative constraints are associated with negative feedback during the usage cycle.

3. The computer-implemented method of claim 2, wherein at least some timeslots within the respective subsets of the plurality of timeslots for different communication links do not overlap.

4. The computer-implemented method of claim 2, wherein the negative feedback for a communication link is a reduced available bandwidth on the corresponding communication link during the predetermined number of timeslots.

5. The computer-implemented method of claim 2, wherein the negative feedback for a communication link is an increased peering rate on the corresponding communication link during each of the plurality of timeslots.

6. The computer-implemented method of claim 2, wherein:

determining the allocation of the packet data traffic demands comprises determining a lower bound of the mixed integer linear programming model by relaxing the binary constraints that remove the negative feedback and solving the mixed integer linear programming model; and solving the mixed integer linear programming model comprises performing a branch and bound algorithm to obtain a solution that is within a fraction of the lower bound.

7. The computer-implemented method of claim 1, wherein the predetermined percentage corresponds to a 5th percentile and the timeslots are approximately five minutes in duration.

8. The computer-implemented method of claim 1, the method further comprising receiving traffic demands as estimated future values based on one or more prior usage cycles.

9. The computer-implemented method of claim 1, wherein at least some of the plurality of communication links are coupled with different internet service providers.

10. A system comprising:

at least one processor, and at least one memory storing computer-executable instructions that when executed by the at least one processor cause the system to:

divide a usage cycle for the plurality of communication links into a plurality of timeslots;

receive packet data traffic demands for the packet data for transmission via the plurality of communication links;

based on a mixed integer linear programming model, determine an allocation of the packet data traffic demands to the plurality of communication links during the usage cycle using binary constraints of the mixed integer linear programming model, wherein the binary constraints prioritize respective subsets of the plurality of timeslots for at least some of the plurality of communication links for allocating the packet data traffic demands, and a number of timeslots within the respective subsets of the plurality of timeslots is within a predetermined percentage of the plurality of timeslots; and reconfigure, for each of the plurality of timeslots, one or more gateways that correspond to the plurality of communication links to route the packet data using the determined allocation of the packet data traffic demands.

11. The system of claim 10, wherein determining the allocation of the packet data traffic demands includes using the binary constraints to prioritize the ones of the plurality of communication links by removing, from the mixed integer linear programming model, negative constraints for the ones of the plurality of communication links for the predetermined number of the plurality of timeslots, wherein the negative constraints are associated with negative feedback during the usage cycle.

* * * * *